United States Patent [19]
Curran

[11] 3,771,562
[45] Nov. 13, 1973

[54] THREE WAY CONTROL VALVE

[75] Inventor: John R. Curran, Attleboro, Mass.

[73] Assignee: The Foxboro Company, Foxboro, Mass.

[22] Filed: Jan. 6, 1972

[21] Appl. No.: 215,788

Related U.S. Application Data

[63] Continuation of Ser. No. 42,426, June 1, 1970, Pat. No. 3,648,718.

[52] U.S. Cl. .......................... 137/625.4, 137/625.48
[51] Int. Cl. .............................................. F16k 11/00
[58] Field of Search .................. 137/625.4, 625.41, 137/625.49, 625.5, 625.68, 625.38, 454.5, 454.6, 270, 271

[56] References Cited
UNITED STATES PATENTS

| 1,807,446 | 5/1931 | Smeby | 137/625.37 |
| 3,572,382 | 3/1971 | Luthe | 137/625.35 |
| 3,548,874 | 12/1970 | Parks | 137/625.5 |
| 3,123,091 | 3/1964 | Elsey | 137/625.34 X |
| 2,921,603 | 1/1960 | Lofink | 137/625.38 |
| 2,796,851 | 6/1957 | Ziskal | 137/625.68 |
| 3,272,219 | 9/1966 | Frantz | 137/454.5 X |
| 3,330,294 | 7/1967 | Manning et al. | 137/625.38 X |
| 3,426,799 | 2/1969 | Kintner | 137/625.48 |
| 3,574,311 | 4/1971 | Fairbanks | 137/625.68 |

*Primary Examiner*—Samuel Scott
*Attorney*—Norman E. Brunell

[57] ABSTRACT

A three way industrial control cage valve suitable for both flow divergence and flow convergence without modification that is both stable and balanced in either direction for use with pneumatic actuators.

9 Claims, 1 Drawing Figure

Patented Nov. 13, 1973 3,771,562
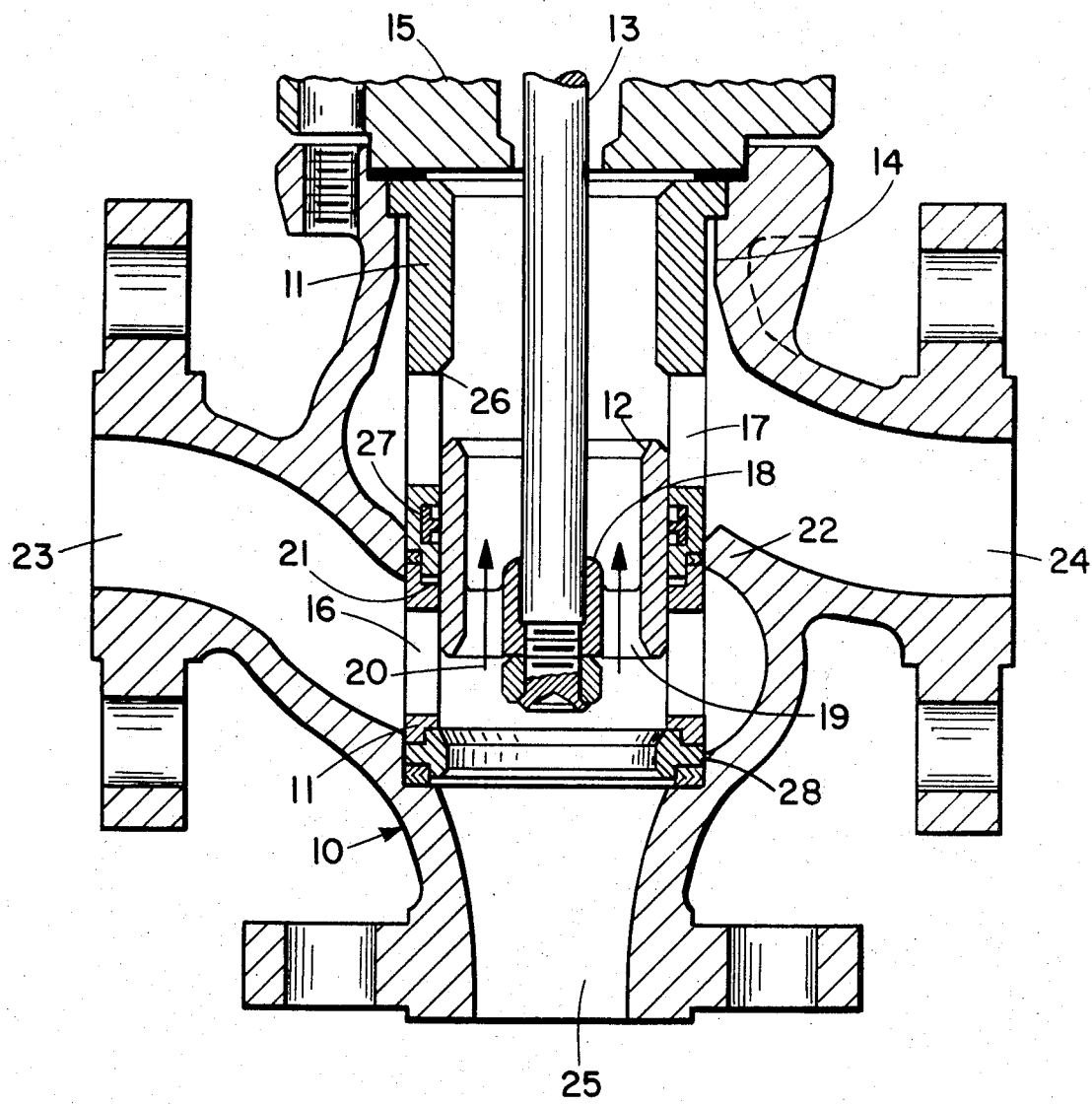

THREE WAY CONTROL VALVE

CROSS REFERENCE TO RELATED APPLICATION

This is a continuation of application, Ser. No. 42,426 filed June 1, 1970, now U.S. Pat. No. 3,648,718, issued Mar. 14, 1972.

BACKGROUND OF THE INVENTION

1. Field of the Invention

This invention relates to three way industrial process control valves and has particular reference to pneumatically actuated valves used for flow divergence (splitting) and flow convergence (blending). Specifically, this invention relates to a cage valve structure of a type that is stable in both configurations. In particular, this invention relates to such a valve that is also balanced.

Flow divergence, or splitting, describes a configuration wherein a valve is utilized to split a single inflowing stream of fluid into two separate and distinct outflowing streams. A control valve of this type is one capable of varying the ratio of the volumes of the two outflowing streams, the sum of which, of course, must equal the volume of the inflowing stream.

Flow convergence or blending describes a configuration wherein a valve is utilized to blend two incoming streams of fluid into one single outflowing stream. A control valve of this type is one capable of varying the blending ratio of the two inflowing streams that comprises the outflowing stream.

A stable valve is one in which the forces applied by the fluid to the valve plug oppose motion of the valve stem by the actuator in either direction. An unstable valve is, therefore, one in which the resultant force applied to the plug by the stream aids the motion of the actuator resulting in loss of control of valve plug position.

A balanced valve is one in which the resultant force applied to the valve plug by the fluid stream is negligible. Therefore, in a high pressure system, the actuator only has to overcome friction and not flow forces to move the valve stem.

2. Description of the Prior Art

The conventional approach to control of flow convergence and divergence has been to utilize two different valve structures. This was necessary because valves of the type have always been stable only in one direction and unstable in the other.

Flow divergence has typically been handled by a valve structure utilizing a pair of interconnected valve plugs each in the downstream side of and within the separate outlet passages. Control is accomplished by moving one plug towards its seat to restrict flow into that passageway. The plugs are interconnected so that the other plug is caused to move away from its seat increasing flow into that passageway.

This structure is relatively stable, but unbalanced, in this configuration, but unstable if the flow directions are reversed in order to perform a blending operation.

Flow convergence has typically been handled by a valve structure utilizing a single plug in the downstream end and therefore within the single outlet passage. Control is accomplished by moving this single plug between two seats, one in each inlet.

This structure is relatively stable, but unbalanced, in this configuration, but unstable if the flow is reversed to use this structure for flow splitting.

SUMMARY OF THE INVENTION

In order to provide a single valve structure suitable for stable operation in both flow diverging and converging configurations, the instant invention utilizes a cage valve structure with a hollow cage valve plug. The single stream passageway communicates directly with the hollow central area of the plug. The plug is movable to alternately block or unblock portions of the openings communicating with the parallel stream passageways.

The bidirectional stability results therefrom because although the single stream of fluid exerts a force in the direction of motion of the plug the force is negligible due to the hollow opening in the plug. The parallel stream fluids exert forces on the plug primarily laterally to its direction of motion. Therefore, the resultant fluid force on the plug is negligible in the direction of the plug's possible motion.

A major advantage of the instant invention, in addition to its bidirectional stability, is therefore its balanced operation.

BRIEF DESCRIPTION OF THE DRAWING

The FIGURE is a vertical central section of a cage valve showing a preferred embodiment of the invention.

DESCRIPTION OF THE PREFERRED EMBODIMENT

In the FIGURE the structure comprises a valve body 10, a cage 11, and a valve plug 12 secured to and operated through a valve stem 13.

The body 10 is provided with an access opening 14 for receiving the stem 13. This opening is closed by the lower portion of a bonnet 15. This strucutre holds the cage 11 in a drop-in assembly manner.

The cage 11 has a lower set of side wall ports 16 and an upper set of side wall ports 17. The plug 12 is a sleeve, piston-mounted within the cage 11. The stem 13 is secured to a central boss 18 of the plug 12, the boss 18 being supported by ribs 19. Thus the plug is open to lengthwise flow therethrough, past the ribs 19, at all times. The plug, in its movement within the cage, can close off either the top cage ports 17, or the bottom cage ports 16, but not passages through the plug, indicated by arrows 20.

The cage 11 may be a unitary structure or one cage end-mounted on another, as indicated by the juncture 21. In either case, the cage structure extends through and is laterally supported by a valve body bridge 22. Suitable seals may be used, as shown, between the cage and the plug, and between the cage and the internal body bridge 22.

The body 10 is provided with two side ports, at 23 and 24, and a bottom port 25. The bottom port 25 is always flow connected to either or both body ports 23 and 24. As shown, with the plug 12 midway of its movement, both body ports 23 and 24 are partially open to each other and to the body port 25. The valve stem 13 is positioned by an actuator not shown, mounted vertically above the valve body affixed to the bonnet 15.

The actuator moves the cage plug vertically within the cage. At the top of its stroke, bottom port 25 is connected for flow to side port 23 through side wall port 17 but sealed from side port 24 because plug 12 blocks side wall ports 17 leading to side port 24. In this position the upper surface of the plug seals against the upper cage seat 26 shown as an integral portion of the cage. The lower surface of the plug 12 is in contact with middle seal 27.

At the bottom of its stroke, bottom port 25 is connected for flow to side port 24 through side wall port 17 but sealed from side port 23 because plug 12 blocks side wall port 16. In this position, the upper surface of the plug seals against middle seal 27 and the lower surface of the plug seals against lower seat 28.

In intermediate vertical positions of plug 12 bottom port 25 is connected to side ports 23 and 24 with varying degrees of restriction.

It is obvious, therefore, that the embodiment of the instant invention shown may be used productively as a balanced, stable valve for either flow convergence or divergence.

If two separate flows are connected to side ports 23 and 24 they will be blended at a ratio dependent upon the vertical position of plug 12. The resultant converged flow will leave via bottom port 25.

Flow splitting can be accomplished by connecting the single stream to bottom port 25. It will be split, at a ratio dependent on the vertical position of plug 12, into two streams leaving by side ports 23 and 24.

Although a preferred embodiment of the invention is shown, many changes and modifications may be made therein without departing from the scope and spirit of the invention.

I claim:

1. For use in a control valve structure, a sub-assembly comprising a three-way valve body and valve plug combination wherein a valve plug with lengthwise passage therethrough in the manner of a balanced valve plug, is movable as a piston within a cage structure, said cage structure having one flow opening wall situation at one end thereof and another flow opening wall situation at the other end thereof whereby movement of said plug selectively opens and closes said cage wall openings in varying ratio, said body having one flow passage connecting one of said cage wall opening situations to the exterior of said valve body, another flow passage connecting the other of said flow passage situations to the exterior of said valve body, and another flow passage connecting said valve plug passage to the exterior of said valve body.

2. A sub-assembly according to claim 1 wherein said cage structure is nested in said valve body and held therein by end pressure from the lower end of a valve bonnet.

3. A sub-assembly according to claim 1 wherein said valve body is provided with an internal shape comprising a pair of annular chambers joined by a cylindrical form, each of said chambers connected to a different one of said flow passages to the valve exterior, one of said chambers also connected to still a different one of said flow passages to the valve exterior, and an access opening to said valve body and to the other of said chambers for receiving a valve stem and plug assembly.

4. A sub-assembly according to claim 1 wherein said cage structure comprises two conventional valve cages mounted end-to-end.

5. A three way valve comprising:
a hollow cylindrical cage having two series of ports along its axis,
a plug slidably mounted within said cage having a hollow central section in constant communication with the hollow interior of the cage, said plug being positionable to selectively restrict flow between the hollow interior of the cage and portions of both series of ports, the relative portions depending on plug position.

6. A three way valve as in claim 5 further comprising a circumferential seal means for sealing between the cage interior and the slidably mounted plug, the seal means being contained between the two series of ports.

7. A three way valve as claimed in claim 6 further comprising:
two circumferential seat means for sealing the cage against the ends of the plug, said seats being positioned along the axis of the cage at the extremes of the series of ports.

8. A valve as in claim 7 further comprising:
a hollow valve body for containing the cage having three ports communicating with the two series of ports in the cage and the hollow central section of the plug,
a valve stem coaxical with the cage and plug for positioning the plug within the cage,
and a valve bonnet for compressively securing said cage within said body and for slidably supporting said stem.

9. A stable, balanced three port valve for use in mixing and splitting flow streams, comprising:
a valve body having a cylindrical vertical cavity therein;
a lower port communicating with the cylindrical cavity through a sidewall opening in the body near the lower end of the cavity;
a upper port communicating with the cylindrical cavity through a sidewall opening in the body near the upper end of the cavity;
a hollow cylindrical valve plug mounted for vertical motion coaxially within the cylindrical cavity;
a common port communicating with the interior of the plug so that the flow through the common port equals the combined flow through the upper and lower ports;
sealing means in the cavity for sealing between the inner surface of the cavity and the outer surface of the plug, the sealing means providing a seal in the region below the lower port, between the upper and lower ports, and above the upper port; and
a valve stem for positioning the plug vertically in the chamber to vary the ratio of between the flows through the upper and lower ports.

* * * * *